United States Patent [19]
D'Alelio

[11] 3,886,119
[45] May 27, 1975

[54] EPOXY END-CAPPED AROMATIC POLYIMIDES

[75] Inventor: Gaetano F. D'Alelio, South Bend, Ind.

[73] Assignee: University of Notre Dame du Lac, Notre Dame, Ind.

[22] Filed: Aug. 14, 1974

[21] Appl. No.: 497,491

[52] U.S. Cl............ 260/47 CP; 117/72; 117/124 E; 117/132 B; 117/161 P; 161/214; 260/30.2; 260/30.8 DS; 260/32.2; 260/32.4; 260/32.6 N; 260/47 EP; 260/47 EQ; 260/47 EA; 260/47 EN; 260/49; 260/63 R; 260/65; 260/78 TF; 260/78 SC; 260/841; 260/849; 260/857 R
[51] Int. Cl.............................................. C08g 20/32
[58] Field of Search.. 260/47 CP, 65, 78 TF, 47 EP, 260/47 EQ, 2 EP, 63 R, 78 SC

[56] References Cited
UNITED STATES PATENTS
3,700,617 10/1972 Golownia et al................ 260/326 C

*Primary Examiner*—Lester L. Lee

[57] ABSTRACT

Epoxidized aromatic polyimides and processes for their preparation are provided. The epoxidized polyimides are prepared by reacting a diamine of the formula

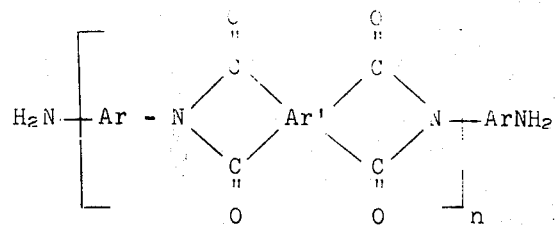

wherein
Ar is a divalent aromatic organic radical,
Ar' is a tetravalent aromatic organic radical and
$n$ is a positive integer of at least 1, with 1 to 4 moles of an epoxy compound (such as epichlorohydrin) of the formula

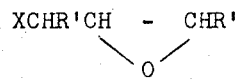

wherein
X is halogen and
R' is hydrogen or a hydrocarbon radical of 1 to 6 atoms.

The reaction is conducted in the presence of an organic or inorganic base at a temperature between ambient and about 100°C. The epoxidized polyimides can be cross-linked by melt reaction, self-reaction or catalysis depending upon the number of epoxy end-groups.

9 Claims, No Drawings

EPOXY END-CAPPED AROMATIC POLYIMIDES

BACKGROUND OF THE INVENTION

1. Field of the Invention

This invention relates to polyimides and processes for their preparation and more particularly to epoxy end-capped aromatic polyimides and processes for their preparation.

2. Prior Art

The invention is aware of no prior art, (1) wherein amino-endcapped, completely cyclized, aromatic polyimides have been converted to epoxy derivatives in which the epoxy group is attached directly to the aromatic terminal nitrogen and (2) of compositions having the structure claimed herein.

A prior art reference of interest in U.S. Pat. No. 3,700,617, issued Oct. 24, 1972, to Robert F. Golownia and Standley Oswitch.

SUMMARY OF THE INVENTION

According to the present invention there is provided an epoxidized aromatic polyimide having the formula:

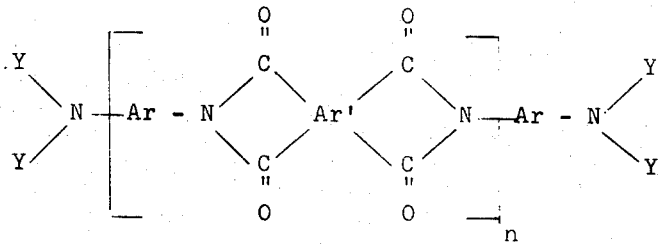

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical,
each Y is hydrogen or

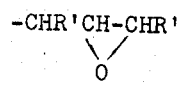

with the proviso that at least one Y is

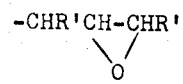

and in which R' is hydrogen or a hydrocarbon radical of 1 to 6 carbon atoms, and
$n$ is a positive integer of at least 1.

There is also provided a process for preparing the above-mentioned epoxidized polyimide which comprises reacting a diamine end-capped aromatic imide with 1 to 4 moles of an epoxy compound such as epichlorohydrin.

DETAILED DESCRIPTION OF THE INVENTION

The epoxidized aromatic polyimides of the present invention use as starting materials amine end-capped aromatic imides, epoxy compounds and hydrohalide acceptors.

Amine end-capped aromatic imides useful in the invention are prepared as described in my copending application Ser. No. 363,800 filed May 25, 1973. These aromatic imides have the structural formula:

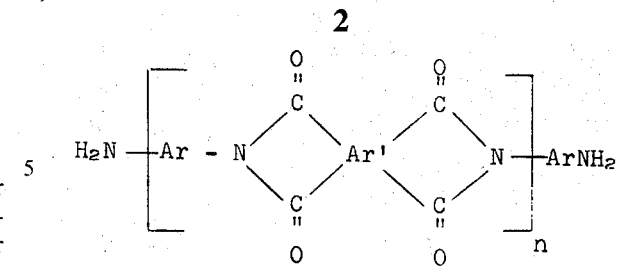

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical, and
$n$ is a positive integer of at least 1, preferably at least 4, i.e., 4 to 100 and most preferably 4 to 20.

As described in my aforesaid application Ser. No. 363,800, the diamine end-capped aromatic imides are prepared by reacting in an aromatic phenol solvent such as m-cresol using an organic azeotroping agent such as benzene $m$ moles of an aromatic dianhydride of the formula

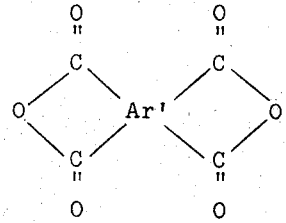

wherein
Ar' is as defined previously with $m + 1$ moles of an aromatic diamine of the formula:

$$NH_2 - Ar - NH_2$$

wherein Ar is as defined previously.

Among the useful dianhydrides are 3,3', 4,4'-'benzophenonetetracarboxylic acid dianhydride, pyromellitic dianhydride, 2,3,6,7-naphthalene tetracarboxylic acid dianhydride, 3,3',4,4'-diphenyl tetracarboxylic acid dianhydride, 1,2,5,6-naphthalene tetracarboxylic acid dianhydride, 2,2',3,3'-diphenyl tetracarboxylic acid dianhydride, 2,2-bis(3,4-dicarboxyphenyl)propane dianhydride, 3,4,9,10-perylene tetracarboxylic acid dianhydride, bis(3,4-dicarboxyphenyl)ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis(2,3-dicarboxyphenyl)propane dianhydride, 1,1-bis-(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, benzene-1,2,3,4-tetracarboxylic acid dianhydride and thiophene-2,3,4,5-tetracarboxylic acid dianhydride and the like. Preferred dianhydrides are 3,3',4,4'-benzophenonetetracarboxylic dianhydride, pyromellitic anhydride and 1,4,5,8-naphthalenetetracarboxylic and dianhydride with the first one most preferred.

Preferred aromatic diamines are those wherein Ar is a divalent benzenoid radical selected from the group consisting of

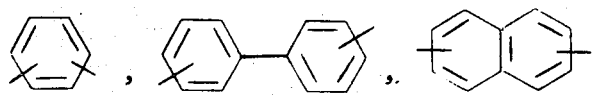

and multiples thereof connected to each other by R, e.g.,

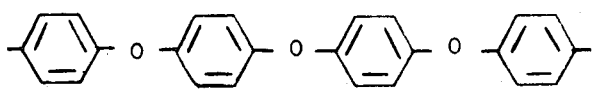

wherein R is alkylene of 1 to 3 carbon atoms,

$-O-$, $-S-$, $-CH\doteq CH$, and $SO_2$. Other useful R groups are

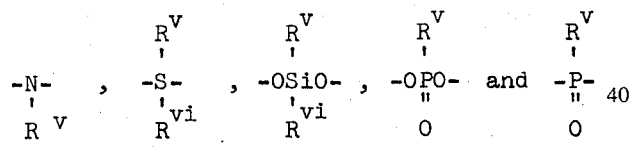

wherein $R^v$ and $R^{vi}$ are each alkyl or aryl containing 1 to 6 carbon atoms, e.g., methyl, ethyl, propyl, hexyl, n-butyl and i-butyl.

Examples of aromatic diamines which are suitable for use in the present invention are 4,4'-diaminodiphenyl propane, 4,4'-diamino-diphenyl methane, benzidine, 3,3'-dichlorobenzidine, 4,4'-diamino-diphenyl sulfide, 4,4'-diaminostilbene, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'-diaminodiphenyl phenyl phosphine oxide, 4,4'-diamino-diphenyl N-methyl amine, 4,4'-diamino-diphenyl N-phenyl amine and mixtures thereof. 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo- 4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, -dibromo- 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminodiphenylpropane, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4 -phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid, and phenylene diamines. Preferred diamines are m-phenylenediamine, p-phenylenediamine, 4,4'-oxydianiline, 3,3'-sulfonyldianiline, 4,4'-diaminobenzophenone, 4,4'-methylenedianiline and 4,4'-diaminostilbene.

The epoxy compounds used in the present invention have the structural formula:

$$XCHR'CH - CHR'$$
$$\diagdown O \diagup$$

wherein
X is halogen and, each
R' is hydrogen or a hydrocarbon radical of 1 to 6 carbon atoms such as methyl, ethyl, propyl, hexyl, phenyl, cyclohexyl, butyl and the like.
Preferably, X is chloride and each R' is hydrogen, i.e., the epoxy compound is preferably epichlorohydrin.

The reaction of the diamine end-capped aromatic imide and epoxy compound is conducted by reacting the imide with the epoxy compound as so to replace 1 to 4 of the hydrogen atoms on the terminal amine groups of the amide. At least 1 mole of epoxy compound must be reacted with 1 mole of the diamine end-capped aromatic imide to yield a derivative capable of chain-extending to high molecular weight. As the number of epoxy groups substituted is increased to four, ultimate cured products of increased cross-linked density are obtained. The substitution of one epoxy group on the terminal nitrogen can be achieved by reacting 1 mole of the imide with 1 mole of the epoxy compounds for sufficient time to achieve complete substitution. Alternately 2,3,4 or more moles of the epoxy compound can be present in the reaction mixture and the reaction performed at a lower temperature or in a dilute solvent system terminating the reaction when the desired degree of substitution is obtained, as determined by analyses for epoxy content. The same considerations apply to the di-, tri- and tetra-derivatives in which cases as many as 30 to 100 moles of epoxy compound can be used per mole of imide. The resulting mono to tetra epoxidized aromatic imide can then be cross-linked by the known epoxy resin cures, i.e., by melt reaction, self-reaction or catalysis.

The reaction can be performed in the epoxy compound alone if the imide is soluble therein, or in added solvents. Any solvent can be used provided the aromatic imide is soluble in it. The specific solvent will depend on the particular aromatic imide used. In most cases, the solvent is an aprotic organic compound having a dielectric constant between 35 and 45, preferably one which is water soluble. Representative aprotic compounds are N,N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methyl-α-pyrrolidone, tetramethylurea, hexamethylphosphoramide, tetramethylene sulfone, N,N,N',N'-tetramethyl-α-ethylmalonamide, N,N,N',N'-tetramethylglutaramide, N,N,N',N'-tetramethylsuccinamide, thiobis(N,N-dimethylacetamide), bis(N,N-dimethylcarbamylmethyl)-ether, N,N,N',N'-tetramethylfuraramide, methylsuccinonitrile, N,N-dimethylcyanoacetamide, N,N-dimethyl-β-cyanopropionamide, N-formyl-piperidine and butyrolactone, etc.

Of the solvents, dimethylacetamide is most preferred. Other preferred solvents are dimethylformamide, N-methyl pyrrolidone, dimethyl sulfoxide, butyrolactone and caprolactam.

In many cases, non-aprotic solvents can be used. For example, xylene, phenol, anisole, benzonitrile, acetophenone, methylphenylether, or mixtures of these with each other, the aprotic solvents or with relatively poor solvents such as benzene, toluene, cyclohexane, cyclohexane, dioxane, butyl cellosolve and the like.

The temperature of reaction will generally be from ambient to about 100°C. at atmospheric pressure, preferably no higher than about 75° to 80°C. The pressure used is atmospheric although sub and superatmospheric pressures can be used. Of course, the temperature will vary somewhat if these latter pressures are used.

The reaction to prepare the epoxidized aromatic imides is conducted in the presence of a hydrohalide acceptor which is any organic or inorganic base which is well known and used in the epoxy art for epoxidizing phenols with epichlorohydrin. Representative bases are alkali metal hydroxides such as sodium hydroxide, potassium hydroxide, lithium hydroxide; alkali metal carbonates such as sodium carbonate and potassium carbonate, alkali metal silicates such as sodium silicate; and organic amines such as trimethylamine, triethylamine, pyridine, quinoline, and N-methyl piperazine. While the amount of base used can vary over wide limits, generally, about 2 to 8 moles of base are used per mole of the diamine end-capped aromatic imide.

The epoxidized products of this invention can be used as prepared in solution or isolated as a solid product. When the process is carried out in a solvent, the process can be interrupted at any desired increased molecular weight or viscosity from a dimer on up and for some purposes, a solid polymer can be isolated by either evaporating the solvent or by use of a precipitating non-solvent for the polymer. Illustrative precipitating liquids, but not limited thereto, are alcohols such as methanol, ethanol, isopropanol, ethylene glycol, propylene glycol; esters such as ethyl formate, ethyl acetate, ethylene glycol diacetate; ethers such as methyl cellosolve, butyl cellosolve, ethyl cellosolve acetate; hydrocarbons such as benzene, toluene, xylene, cyclohexane, cyclohexene; aromatic ethers such as methyl phenylether, hydroxyethyl phenylether, and water. Water and methanol are preferred.

As epoxy compounds, the products of the invention can be utilized or cured by any of the conventional methods used for the current commercially available epoxy resins. For example, they can be reacted and cured with polycarboxylic acids and anhydrides; aliphatic, cycloaliphatic and aromatic polyamines; or catalytically cured by tertiary amines such as tributyl amine, dimethyl benzyl aniline, tribenzyl amine. All of these curing reagents are disclosed in the art such as the epoxy handbooks published by the Dow Chemical Company.

The epoxy products of the invention which contain unreacted aminohydrogen, be they primary or secondary, can be chain-extended or cured by self-condensation or addition through the amino hydrogens without the need for added reagents. When all four oxirane groups are attached to the two terminal nitrogen atoms, catalyst self-curing occurs by oxirane ring opening self-catalyzed by the tertiary nitrogens in its structure. However, it is advantageous in many cases to use additional reagents for chain-extension. For example, when maleic or phthalic anhydride is used as a coreagent with the epoxidized aromatic imides, a slight advantage is obtained in the thermal stability of the cured product.

The epoxy products of this invention have application in a wide variety of physical shapes and forms, including the use as films, molding compounds, coatings, etc. The unusual heat stability and resistance to deformation at elevated temperatures in the cured state, makes these compositions especially unique. When used as films or when made into molded products, these polymers, including laminated products prepared therefrom, not only possess excellent physical properties at room temperature but they retain their strength and excellent response to workloading at elevated temperatures for long periods of time. The fact that they have high decomposition points well above 500°C., and in some instances above 550°C., indicates a wide range of commercial utility for these products. These polymers in particular resist fusion when exposed to temperatures of 410° to 520°C. for extended periods of time while still retaining an exceptionally high proportion of their room temperature physical properties. The ability to make fusible or soluble precursors of the finely cured products makes them especially suitable in the preparation of shaped articles such as films, molded products, etc. whereby using conventional techniques, the mixture of copolymerized ingredients can be converted in situ to the finally cured, infusible and insoluble state.

Films formed from the polymeric compositions of this invention may be used in applications where films have been used previously and in addition films therefrom can be used in applications where films in the past have not been especially suitable. They serve effectively in an extensive variety of wrapping, packaging and bundling applications. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for packaging items to be exposed to high temperatures or to corrosive atmospheres, in corrosion-resistant pipes and duct work, for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures.

Films made from these compositions of matter can serve in printed curcuit applications, for instance, as backings by coating the films made from such cured compositions with a thin layer of copper or aluminum either by coating the metal with the curable or heat-convertible compositions herein described and then by heating at elevated temperatures to convert the product to the completely cured state, or by laminating a metal sheet to the cured resinous composition. The circuit design is then covered by a protective coating and the extra metal is etched off followed by washing to prevent further etching. An advantage of making such circuit boards is that the base film is stable to heat so that it can be connected to other components by a dip soldering technique while in contact with the other components without adversely affecting the resinous support base.

Alternatively, solutions of the curable compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommend these resins include their use as binders for asbestos fibers, carbon fibers, and other fibrous materials in making brake linings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended. So-called resistance or semiconducting paints may also be made from the compositions by incorporating in solutions or dispersions of the curable polymeric mixture, controlled amounts of conducting materials such as carbon, silicon carbide, powdered metal, conducting oxides, etc. in order to impart to the cured paint the particular degree of resistance of semiconduction.

Among the specific applications for which the compositions herein defined may be employed include as finishes for the interiors of ovens, clothing driers, as finishes for cooking utensils, muffler liners, liners for high temperature equipment including liners for hot water heaters, as protective coatings for fragile or brittle substrates such as protective coatings for high temperature bulbs, glass equipment, etc., as flame-retardant paints, as belting for use in high temperature conveyors, etc.

The compositions herein defined may suitably be incorporated in other materials to modify the properties of the latter or in turn their properties may be modified by the incorporation of the other material. For example, they may be compounded with substances such as natural or synthetic rubbers, synthetic resins such as phenol-aldehyde resins, urea aldehyde resins, alkyd resins, etc.; cellulosic material such as paper, inorganic and organic esters of cellulose such as cellulose acetate, cellulose ether; such as methyl cellulose, ethyl cellulose, benzyl cellulose, etc. In some instances, plasticizers and other modifying agents may be used in combination therewith to yield products which when applied to a base member and air dried or baked have a high degree of heat-resistance due to the presence of the compositions herein defined.

The invention can be further understood by the following examples in which parts and percentages are by weight unless otherwise indicated.

EXAMPLE 1

This example uses as the diamine an amine-terminated oligomeric polyimide (BTAT-6) prepared by using the procedure of Example 24 of my copending application, Ser. No. 363,800, filed May 25, 1973. BTAT-6 was prepared using 4 moles of 3,3′4,4′-benzophenonetetracarboxylic acid dianhydride (BTCA) and 5 moles of 1,3-di(3-aminophenoxy) benzene (DAPB-3,3).

A mixture of BTAT-6 (2.606 g., 0.001 mole), epichlorohydrin ml.) and NaOH(0.08 g., 0.002 mole) was heated at 60°–70°C. for 24 hours. Complete solution did not occur during the heating period. After cooling, the mixture was filtered and the solid collected. The isolated solid was washed with water until the aqueous layer was free of chloride ion and then the so lid was vacuum-dried at ambient temperature to give 1.072 g. of BTEP-4 (a portion of the solid was accidentally spilled) as a yellow solid.

On a Fisher-Johns apparatus, BTEP-4 began to melt at 255°C. but had not completely melted at 300°C. The drop melt, taken at the lowest temperature at which a sample would completely melt when it was dropped onto the preheated stage of the Fisher-Johns apparatus, was 250°C.

When the reaction was repeated using twice as much NaOH (0.16 g., 0.004 mole), there was obtained 1.8983 g. of BTEP-5 as a yellow powder. On a Fisher-Johns apparatus, BTEP-5 began to melt at 215°C. but had not completely melted by 300°C. The drop melt was 250°C.

Similar results are obtained when bromopropylene oxide is used in place of epichlorohydrin.

EXAMPLE 2

Preparation of Epoxide-Terminated Oligomeric Polyimide (BTEP-6) Reaction of BTAT-6 With Epichlorohydrin in the Presence of NaOH in Dioxane To a solution of BTAT-6 referred to in Example 1 (2.606 g., 0.001 mole) dissolved in 25 ml. of dioxane was added NaOH (0.08 g., 0.002 mole and epichlorohydrin (0.37 g., 0.004 mole). The mixture was stirred at 65°–70°C. for 24 hours during which time the solution changed from orange to yellow, and a precipitate slowly formed. After cooling, the mixture was flash-evaporated to give a yellow, pasty solid. The pastry solid was washed three times with 25 ml. of water and then vacuum-dried at ambient temperature for 24 hours to give a tetra-epoxidized polyimide BTEP-6 (2.7052 g.) as a yellow powder. BTEP-6 was insoluble in dioxane, dimethylacetamide and sulfolane. On a Fisher-Johns apparatus, BTEP-6 melted over the range 200°–225°C., thickened above 230°C., and did not harden during 90 minutes at 300°C. The drop melt was 250°C.

The reaction was repeated using BTAT-6 (1.578 g., 0.0006 mole), NaOH (0.0935 g., 0.0024 mole), epichlorohydrin (0.448 g., 0.00485 mole) in 18 ml. of dioxane. There was obtained 1.4237 g. of BTEP-7 as a yellow powder which was also insoluble in dimethylacetamide, sulfolane and dioxane. On a Fisher-Johns apparatus, BTEP-7 melted over the range of 220°–260°C., thickened above 280°C. and hardened after 1 hour at 300°C.

EXAMPLE 3

Post Reactions of Epoxides BTEP-4 to BTEP-7

Small samples of each of the epoxides prepared in Examples 1 and 2 were placed into small test tubes, the tubes were flushed with nitrogen and then capped with a nitrogen-filled balloon. Then the tubes were placed into a preheated metal block. After 1 hour, the tubes were removed and allowed to cool. Reactions were also performed in which curing agents were incorporated. The data, including the curing agents and reaction temperatures, are shown in Table I.

TABLE I

| Epoxide | Agent | Cure Block Temp.°C. | TGA Inflection Pt.°C. | % Wt. Loss at 500°C. |
|---|---|---|---|---|
| BTEP-4 | None | 300 | 475 | 12 |
| do. | 1:1 mole m-PDA | 250 | 450 | 27 |
| BTEP-5 | None | 300 | 460 | 16 |

TABLE I-Continued

| Epoxide | Agent | Cure Block Temp.°C. | TGA Inflection Pt.°C. | % Wt. Loss at 500°C. |
|---|---|---|---|---|
| do. | 5% Wt. DMP-30 | 300 | 490 | 14 |
| do. | 1:2 mole m-PDA | 250 | 465 | 27 |
| BTEP-6 | 1:1 mole m-PDA | 225 | 545 | 7 |
| BTEP-7 | 1:1 mole m-PDA | 225 | 450 300 | 31 |
| do. | 1:2 mole m-PDA | 250 | 250 450 | 30 |
| do. | 5% Wt. Bz₃N | 225 | 470 | 22 | m-PDA = m-phenylenediamine
DMP-30 = 2,4,6-tri-(dimethylaminomethyl)phenol
Bz₃N = Tribenzylamine

EXAMPLE 4

Example 1 is repeated using as the amine-terminated oligomeric polyimide an imide prepared by reacting 5 moles of p-phenylene diamine with 4 moles of BTCA according to the procedure of my aforesaid copending application. Similar results are obtained.

EXAMPLE 5

An amine-terminated oligomeric polyimide is prepared from 8 moles of oxydianiline and 7 moles of pyromellitic dianhydride according to the procedure of my aforesaid copending application. This aromatic imide is used in a repeat of Example 1 with similar results.

EXAMPLE 6

Example 2 is repeated using as the diamine-terminated aromatic amide an imide prepared using 2 moles of a diamine of the formula:

and 1 mole of BATCA. Similar results are obtained.

EXAMPLE 7

Example 1 is repeated using 9 moles of methylene dianiline and 8 moles of BTCA to prepare the diamine-terminated aromatic imide. Similar results are obtained.

Similar results are obtained when sulfonyl dianiline is used in place of methylene dianiline.

What is claimed is:
1. An epoxidized aromatic polyimide having the formula

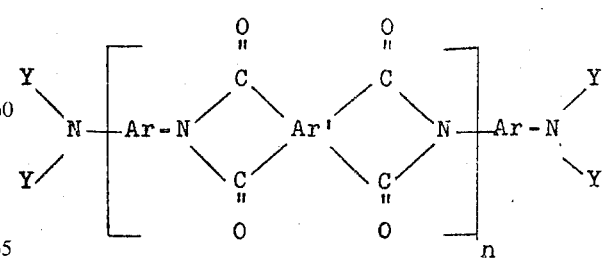

wherein

Ar is a divalent aromatic organic radical,

Ar' is a tetravalent aromatic organic radical, the four carbonyl groups being attached directly to separate carbon atoms and each pair of carbonyl groups being attached to adjacent carbon atoms in the Ar' radical, each Y is hydrogen or

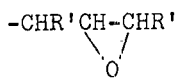

with the proviso that at least one Y is

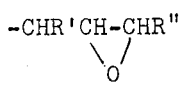

and in which R' is hydrogen or a hydrocarbon radical of 1 to 6 carbon atoms, and n is a positive integer at at least 1.

2. The epoxidized polyimide of claim 1 wherein R' is hydrogen and n is at least 4.

3. The epoxidized polyimide of claim 2 wherein Ar is selected from the group consisting of

and multiples thereof connected to each other by R, wherein R is alkylene of 1 to 3 carbon atoms,

—O—, —S—, —CH=CH—, and —SO$_2$—, and Ar' is selected from the group consisting of

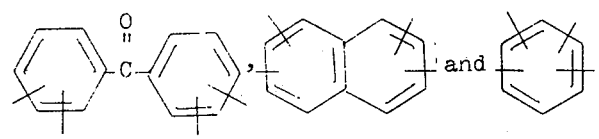

4. A process for preparing an epoxidized aromatic polyimide comprising: reacting a diamine of the formula

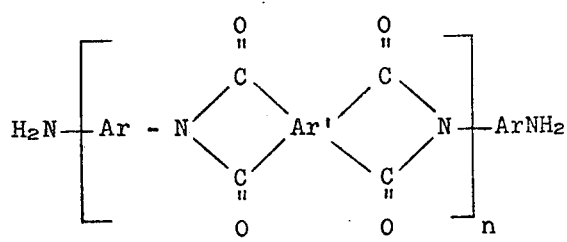

wherein

Ar is a divalent aromatic organic radical,

Ar' is a tetravalent aromatic organic radical, the four carbonyl groups being attached directly to separate carbon atoms and each pair of carbonyl groups being attached to adjacent carbon atoms in the Ar' radical, and n is a positive integer of at least 1, with n' moles of an epoxy compound of the formula

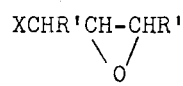

wherein

X is halogen,

R' is hydrogen or a hydrocarbon radical of 1 to 6 carbon atoms, and n' is a positive integer of 1 through 4 inclusive, in the presence of a base at a temperature in the range of between ambient to about 100°C.

5. The process of claim 4 wherein the temperature is in the range of between ambient and about 80°C.

6. The process of claim 5 wherein the base is selected from the group consisting of an alkali metal hydroxide, an alkali metal carbonate, an alkali metal silicate and an organic tertiary amine.

7. The process of claim 6 wherein Ar is selected from the group consisting of

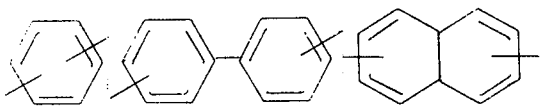

and multiples thereof connected to each other by R, wherein R is alkylene of 1 to 3 carbon atoms,

—O—, —S—, —CH=CH—, and —SO$_2$, and Ar' is selected from the group consisting of

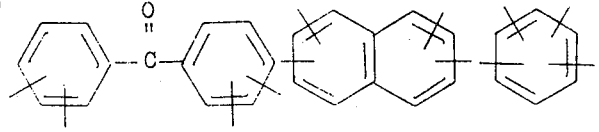

8. The process of claim 7 wherein R' is hydrogen.

9. The process of claim 8 wherein X is chloride.